United States Patent [19]

Vaughan

[11] Patent Number: 5,628,899
[45] Date of Patent: May 13, 1997

[54] CONTROL MECHANISM FOR CONTROLLING REGENERATION OF TWO WATER TREATMENT TANKS

[75] Inventor: Don Vaughan, Brookfield, Wis.

[73] Assignee: Fleck Controls, Inc., Brookfield, Wis.

[21] Appl. No.: 401,961

[22] Filed: Mar. 10, 1995

[51] Int. Cl.$^6$ ................................................ B01D 24/46
[52] U.S. Cl. ................ 210/142; 137/599.1; 137/625.46; 210/190; 210/278
[58] Field of Search ............................ 210/96.1, 97, 98, 210/140, 142, 143, 190, 269, 670, 672, 278; 137/599, 599.1, 624.14, 624.18, 625.46, 625.29, 625.47

[56] References Cited

U.S. PATENT DOCUMENTS

| | | | |
|---|---|---|---|
| 3,891,552 | 6/1975 | Prior et al. | 210/88 |
| 4,210,532 | 7/1980 | Loke | 210/136 |
| 4,298,025 | 11/1981 | Prior et al. | 137/624.14 |
| 4,380,251 | 4/1983 | Weaver | 137/877 |
| 4,632,150 | 12/1986 | Gagas | 210/190 |
| 4,764,280 | 8/1988 | Brown et al. | 210/662 |
| 4,921,598 | 5/1990 | Desch | 137/599.1 |
| 5,022,994 | 6/1991 | Avery et al. | 210/670 |
| 5,045,187 | 9/1991 | Suchanek | 210/140 |
| 5,069,779 | 12/1991 | Brown et al. | 210/143 |
| 5,174,337 | 12/1992 | Dahlen et al. | 137/599.1 |
| 5,256,283 | 10/1993 | Buettner | 210/278 |
| 5,273,070 | 12/1993 | Chili et al. | 137/599.1 |
| 5,300,230 | 4/1994 | Brane et al. | 210/142 |
| 5,341,834 | 8/1994 | Doherty et al. | 137/599.1 |

FOREIGN PATENT DOCUMENTS 569959  6/1945  United Kingdom ................ 210/278

OTHER PUBLICATIONS

Fleck Controls Model 5000 Service Manual, Jan. 1995.

*Primary Examiner*—Joseph W. Drodge
*Attorney, Agent, or Firm*—Lee, Mann, Smith, McWilliams, Sweeney & Ohlson

[57] ABSTRACT

A control mechanism for a liquid treatment system including a first tank having an inlet and an outlet and a second tank having an inlet and an outlet. The control mechanism includes an inlet passage for receiving liquid to be treated and an outlet passage for dispensing treated liquid. A first valve is provided having a first chamber in fluid communication with the inlet passage and a second chamber in fluid communication with the outlet passage. The first valve is rotatable between a first position and a second position. A second valve is provided in fluid communication with the second chamber of the first valve. The second valve is adapted to selectively open and close a fluid path between the second chamber of the first valve and the first tank and to selectively open and close a fluid path between the second chamber of the first valve and the second tank. When the first valve is located in the first position, the first chamber is in fluid communication with the inlet of the first tank and is sealed from the second tank and the second chamber of the first valve is in fluid communication with the outlet of the first tank. When the first valve is located in the second position, the first chamber is in fluid communication with the inlet of the second tank and the inlet of the second tank and is sealed from the first tank and the second chamber is in fluid communication with the outlet of the second tank.

19 Claims, 8 Drawing Sheets

FIG. 6
FIG. 7
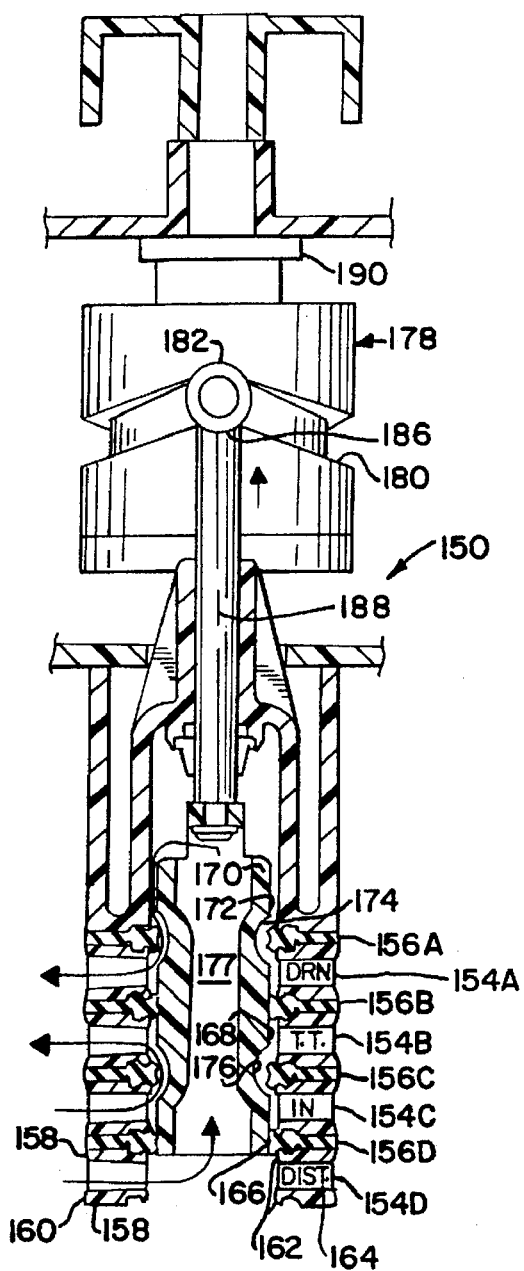
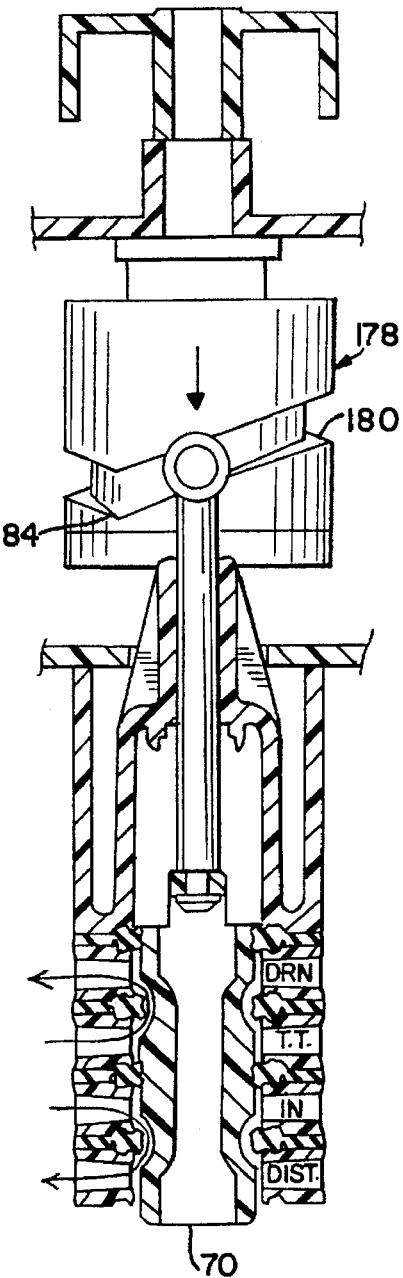
FIG. 8
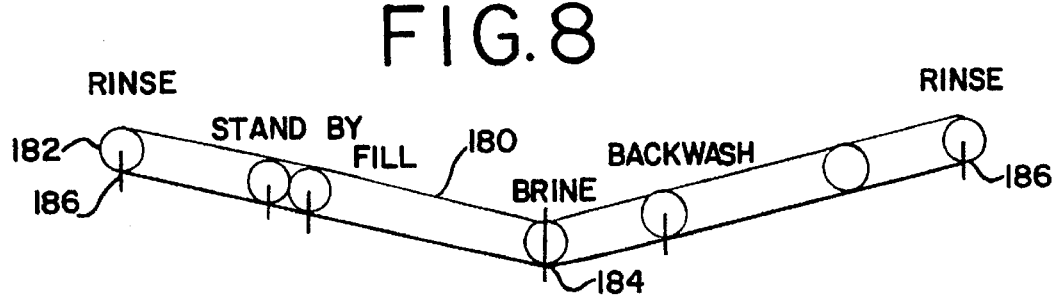

FIG. 13
FIG. 14
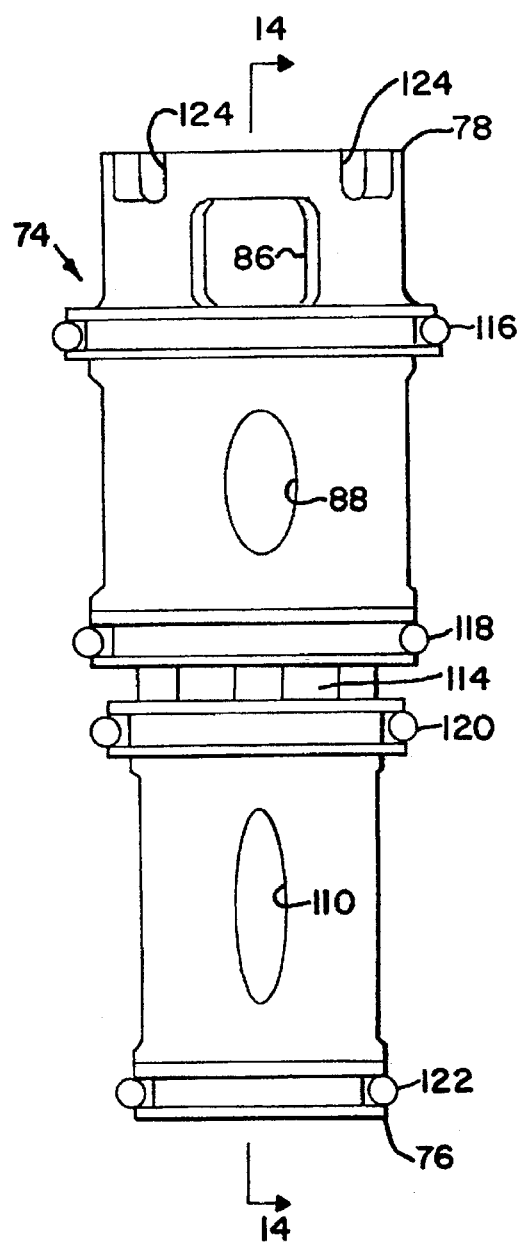
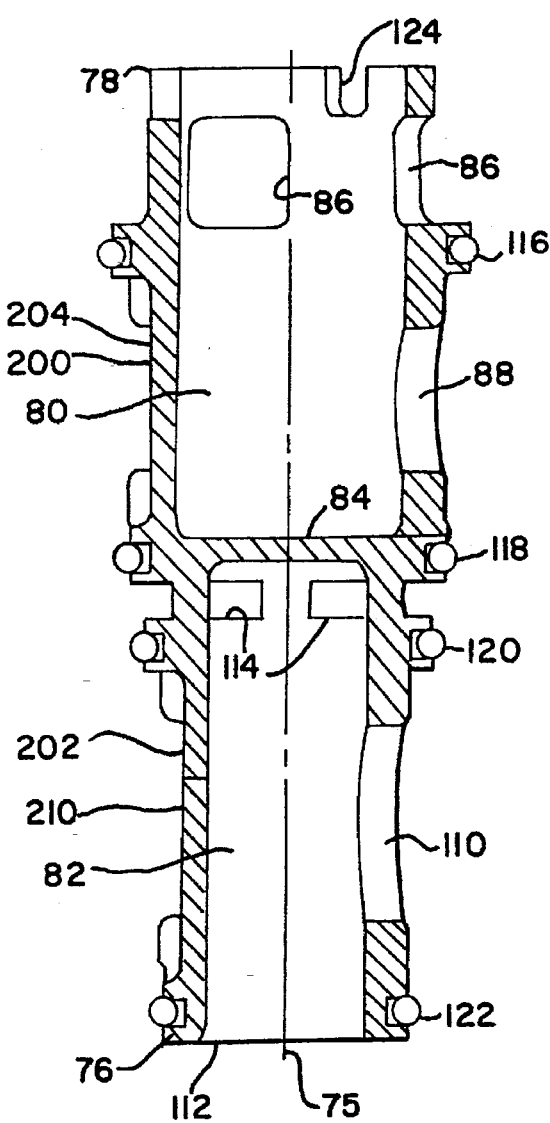

5,628,899

CONTROL MECHANISM FOR CONTROLLING REGENERATION OF TWO WATER TREATMENT TANKS

BACKGROUND OF THE INVENTION

The present invention relates generally to control mechanisms for water treatment systems, and in particular to a control mechanism for controlling two water treatment tanks.

Water treatment devices of the ion exchange type, often referred to as water softeners, typically include a tank having a resin bed through which hard water passes to exchange its hard ions of calcium and magnesium for the soft sodium ions of the resin bed. Regeneration of the resin bed is periodically required to remove the accumulation of hard ions and to replenish the supply of soft ions. Regeneration is usually accomplished by flushing a brine solution from a brine tank through the resin bed. The brine tank typically includes a reservoir and a supply of salt. A supply of water is provided to the reservoir wherein the water reacts with the salt to produce the source of brine for regeneration of the resin bed. Water treatment systems may include two tanks each of which includes a resin bed. While one tank is on-line supplying treated water, the other tank may be regenerated and kept off-line in a stand-by mode. Resin tanks typically include an elongate cylinder in which the ion exchange resin is contained, an inlet formed at the top of the resin tank and a riser pipe which extends downwardly from an outlet at the top of the tank to the bottom of the tank within the resin bed. The present invention provides a control mechanism for selectively taking first and second tanks on-line and off-line and for controlling the regeneration process of each tank.

SUMMARY OF THE INVENTION

A control mechanism for a liquid treatment system including a first tank having an inlet and an outlet and a second tank having an inlet and an outlet. The control mechanism includes an inlet passage for receiving liquid to be treated and an outlet passage for dispensing treated liquid. The control mechanism includes a first valve having a first chamber in fluid communication with the inlet passage and a second chamber in fluid communication with the outlet passage. The first valve is rotatable between a first position and a second position. A rotary camming device is provided for selectively rotating the first valve between the first and second position when a predetermined amount of liquid has been treated by either the first or second tank. A second valve is in fluid communication with the second chamber of the first valve. The second valve is adapted to selectively open and close a fluid path between the second chamber of the first valve and the first tank and to selectively open and close a fluid path between the second chamber of the first valve and the second tank. The first valve also includes a third chamber. The third chamber is in fluid communication with the inlet of the second tank when the first valve is in the first position and the third chamber is in fluid communication with the inlet of the first tank when the first valve is in the second position. The second valve provides selective fluid communication between the second chamber and the third chamber of the first valve. The first valve also includes a fourth chamber. The fourth chamber is in fluid communication with the outlet of the second tank when the first valve is in the first position and the fourth chamber is in fluid communication with the outlet of the first tank when the first valve is in the second position. The second valve provides selective fluid communication between the second chamber and the fourth chamber of the first valve. The second chamber of the first valve includes an inlet port, a first outlet port in fluid communication with the outlet passage and a second outlet port in fluid communication with the second valve. The second valve also includes a drain port for discharging liquid from the liquid treatment system.

BRIEF DESCRIPTION OF THE DRAWINGS

FIG. 6 is a partial cross-sectional view of the regeneration valve shown in a fully raised position.

FIG. 7 is a partial cross-sectional view of the regeneration valve shown in a second position.

FIG. 8 is a schematic diagram showing the location of the piston of the regeneration valve during the various regeneration cycles.

FIG. 13 is a side-elevational view of the rotor of the tank selector valve.

FIG. 14 is a cross-sectional view of the rotor taken along lines 14—14 of FIG. 13.

DESCRIPTION OF THE PREFERRED EMBODIMENT

Figure 1:
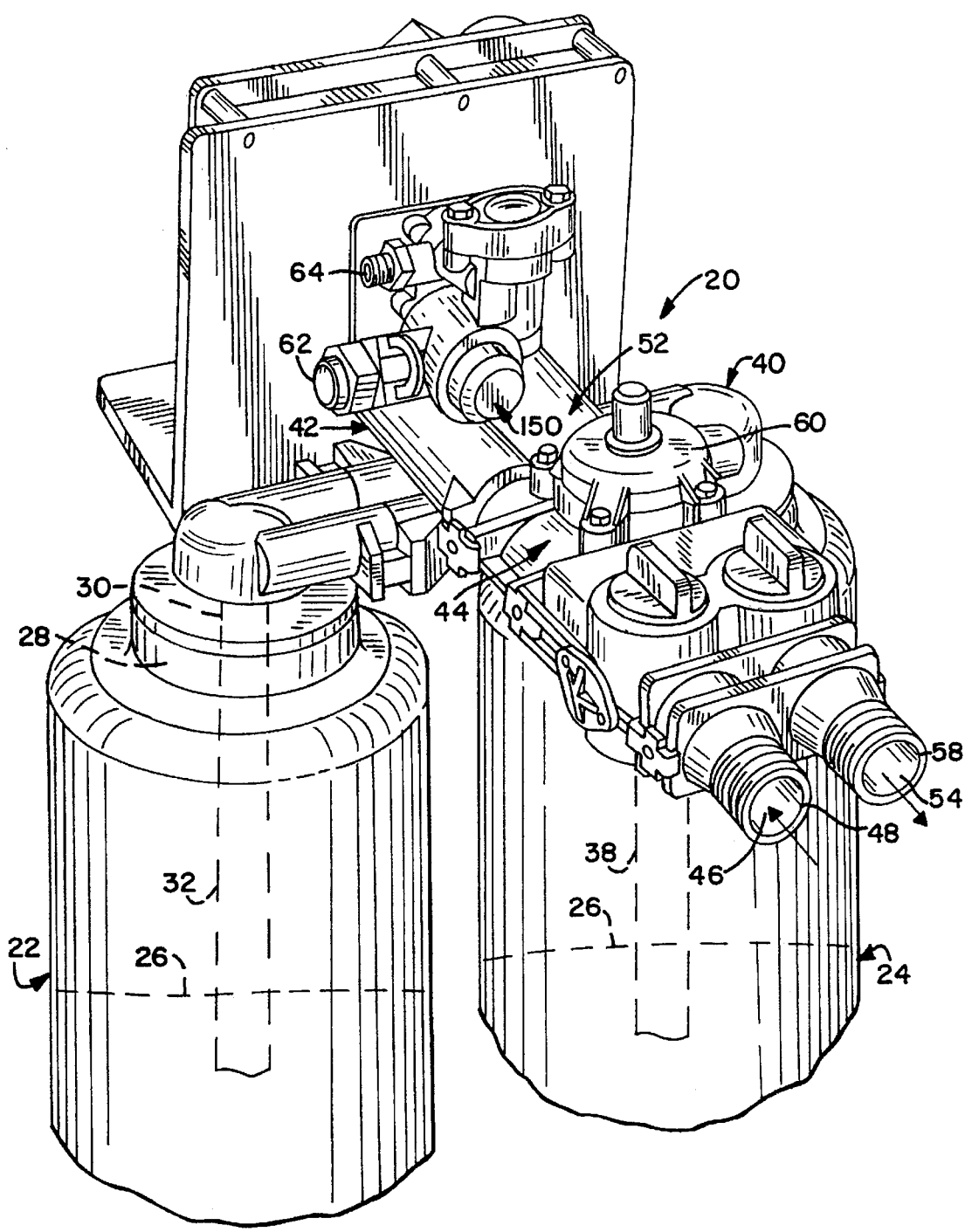
FIG. 1 is a perspective view of the control mechanism of the present invention shown attached to two resin tanks.
Figure 2:
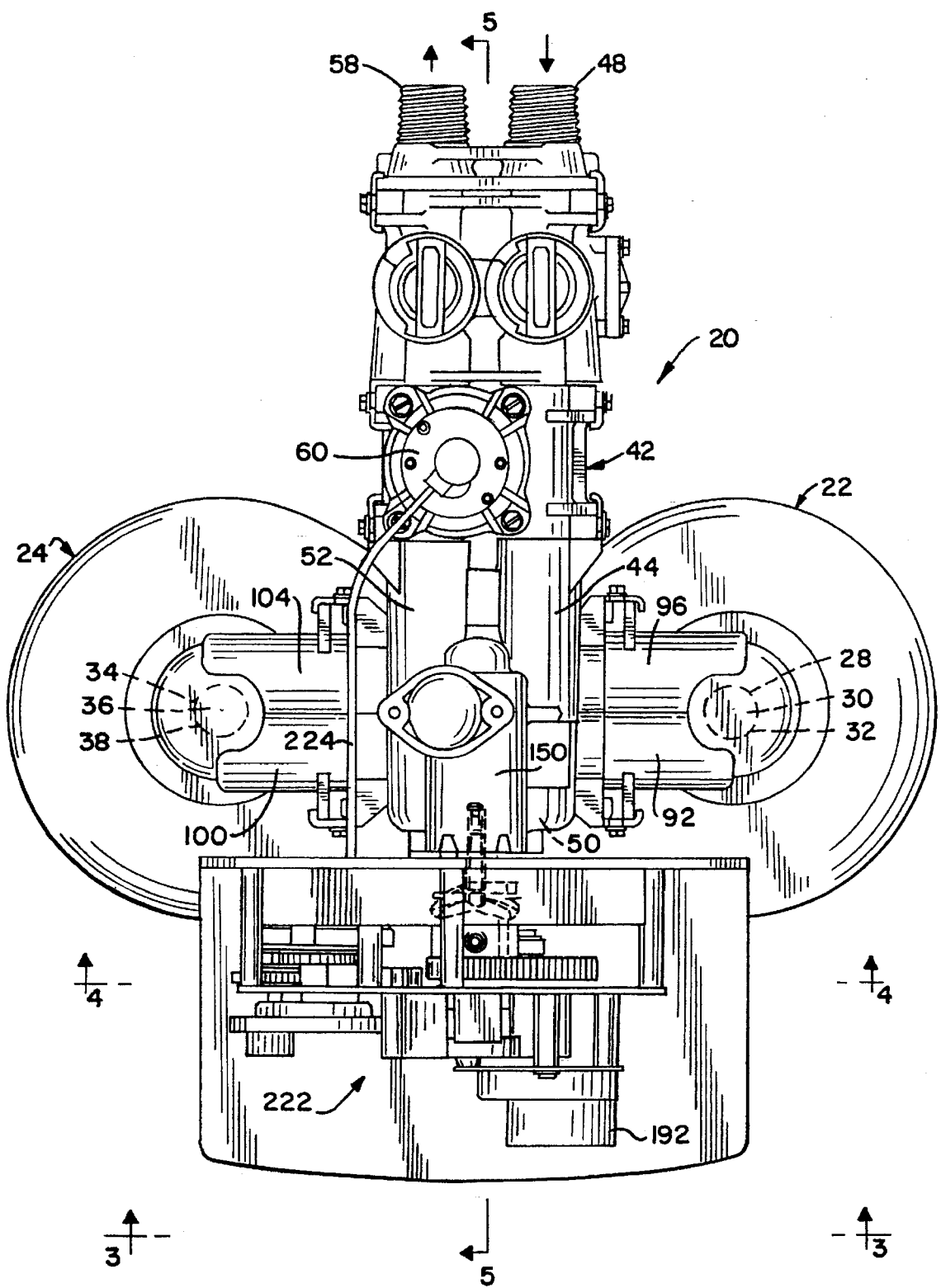
FIG. 2 is a top plan view of the control mechanism of the present invention shown attached to two resin tanks.

The control mechanism 20 of the present invention, as best shown in FIGS. 1 and 2, is adapted for connection to a first resin tank 22 and a second resin tank 24. The resin tanks 22 and 24 each include a resin bed 26 of known construction for exchanging hard calcium or magnesium ions of a liquid such as water for soft sodium ions. The resin tank 22 includes an inlet 28 at the upper end which provides fluid communication with the top of the resin bed 26 and an outlet 30 at the top of the tank 22 which is in fluid communication with the bottom of the resin bed 26 through a riser pipe 32. The resin tank 24 includes an inlet 34 at the top of the tank 24 which provides fluid communication with the top of the resin bed 26 and an outlet 36 at the top of the tank 24 which provides fluid communication with the bottom of the resin bed 26 through a riser pipe 38.

The control mechanism 20 includes a housing 42 made of a plastic material. The housing 42 includes an inlet conduit 44 which forms a liquid inlet passage 46 extending between an inlet port 48 and an outlet port 50. The inlet port 48 is adapted to be connected to a supply of untreated liquid such as water. The housing 42 also includes an outlet conduit 52 which forms a liquid outlet passage 54 which extends between an inlet port 56 and an outlet port 58. The outlet port 58 is connected to a household or commercial plumbing system to supply treated liquid such as water for use. A flow meter 60 of known construction is in fluid communication with the outlet passage 54 to monitor the flow rate and volume of treated water which flows through the outlet passage 54. The housing 42 also includes a drain port 62 adapted to be connected by a tube (not shown) to a drain for disposal of liquid. The housing 42 also includes a brine port 64 adapted to be connected to a brine tank (not shown).

Figure 5:
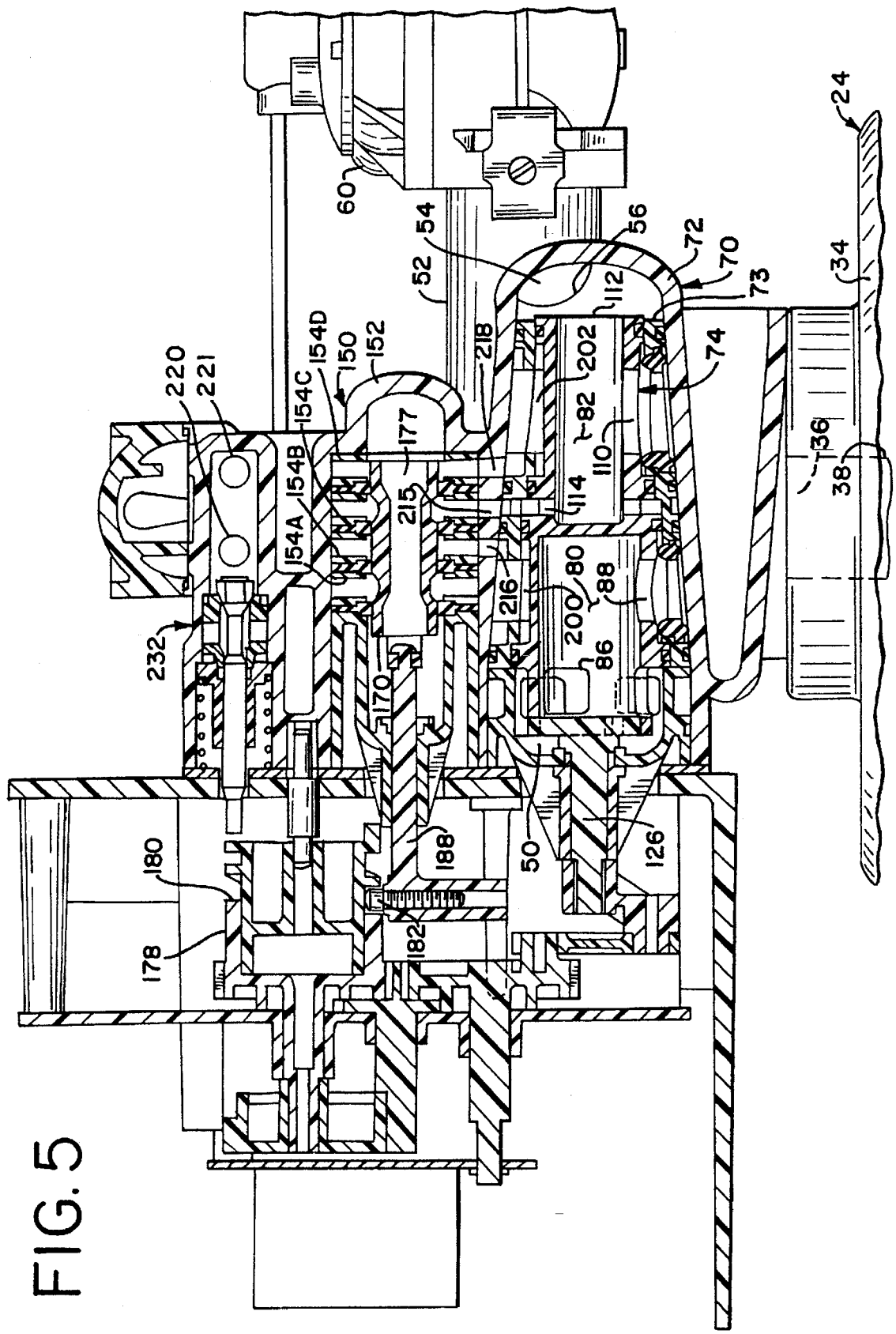
FIG. 5 is a partial cross-sectional view of the control mechanism taken along lines 5—5 of FIG. 2.
Figure 9:
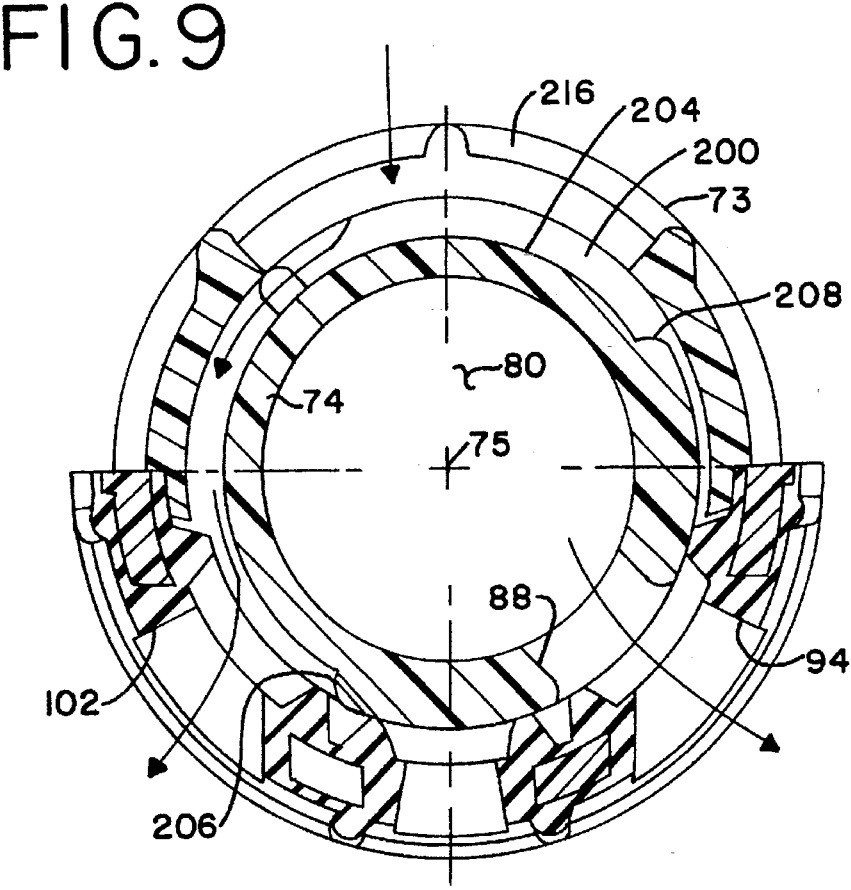
FIG. 9 is a cross-sectional view of the upper chambers of the tank selector valve with the rotor located in the first position.
Figure 10:
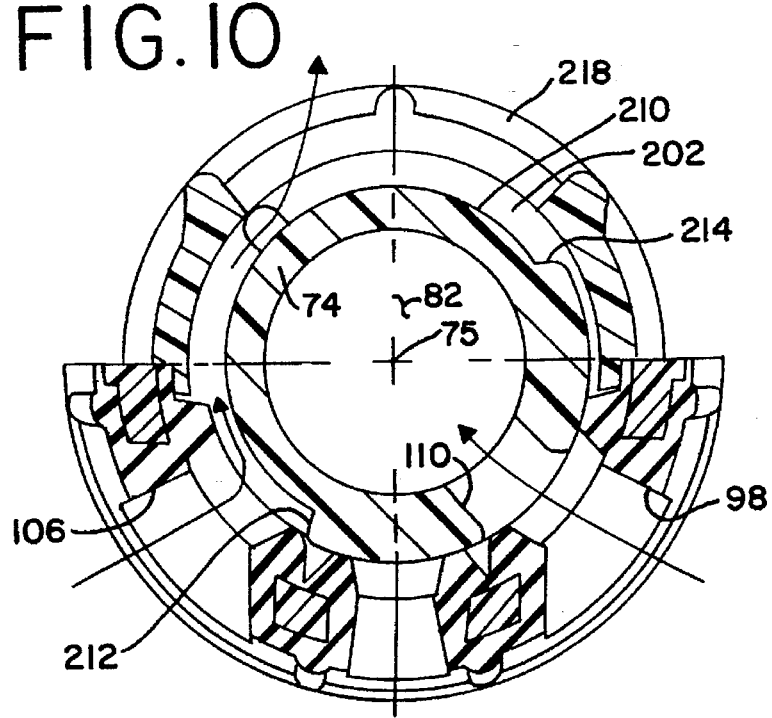
FIG. 10 is a cross-sectional view of the lower chambers of the tank selector valve with the rotor located in the first position.
Figure 11:
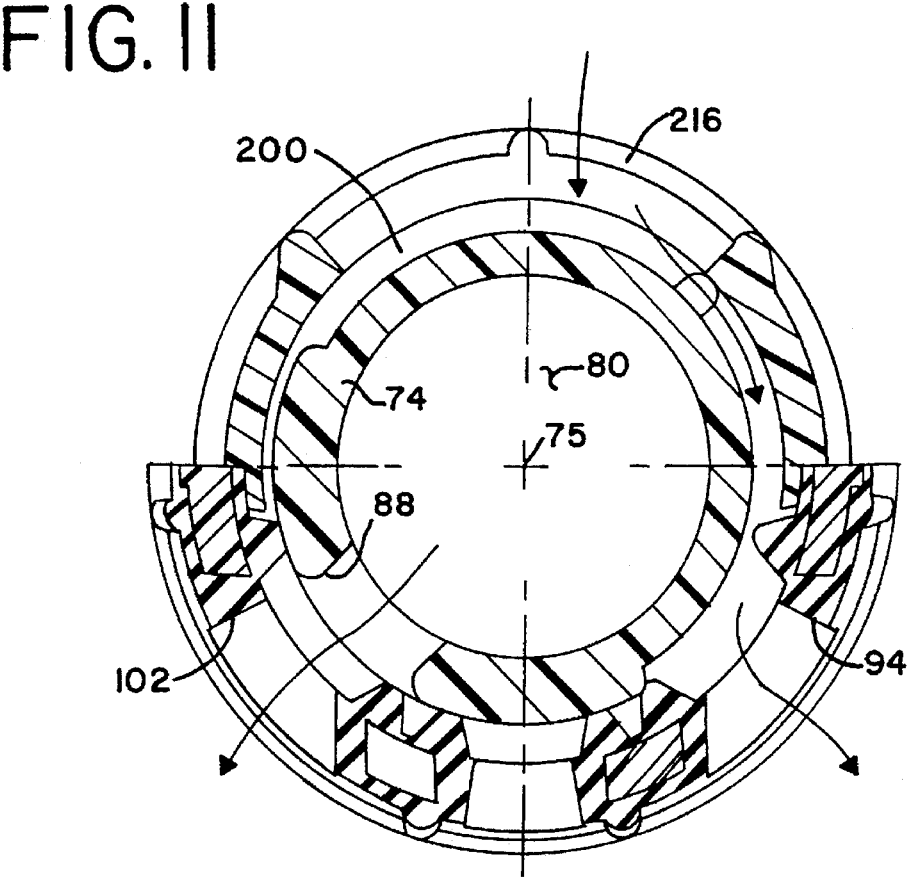
FIG. 11 is a cross-sectional view of the upper chambers of the tank selector valve with the rotor located in the second position.
Figure 12:
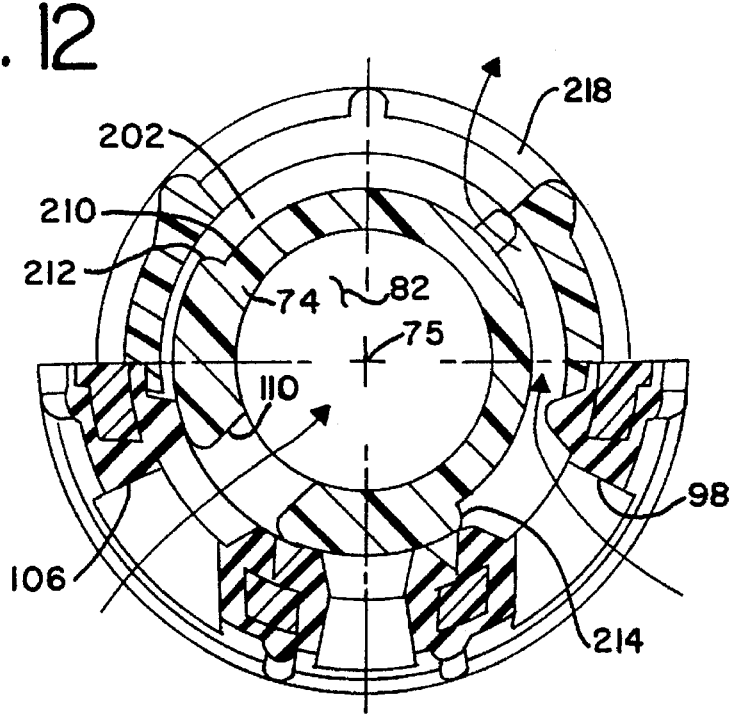
FIG. 12 is a cross-sectional view of the bottom chambers of the tank selector valve with the rotor located in the second position.

The control mechanism 20 includes a tank selector valve 70 as best shown in FIG. 5. The tank selector valve 70 includes a valve housing 72 which is integrally formed with the housing 42. The tank selector valve 70 includes a cage 73 and a rotor 74 rotatably located within the cage 73 as best shown in FIGS. 5, 13 and 14. The rotor 74 is selectively rotatable about a longitudinal axis 75 between a first position as shown in FIGS. 9 and 10 and a second position as shown in FIGS. 11 and 12. The rotor 74 includes a bottom end 76 and a top end 78. The rotor 74 includes an upper chamber 80 and a lower chamber 82 which are sealed from one another by a wall 84. The upper chamber 80 includes a plurality of inlet ports 86 adjacent the top end 78 of the rotor 74. The inlet ports 86 provide fluid communication between the outlet port 50 of the inlet passage 46 and the upper chamber 80 when the rotor 74 is located in the first position and also when the rotor 74 is located in the second position. The upper chamber 80 also includes an outlet port 88.

As best shown in FIGS. 1 and 2, the housing 42 includes a conduit member 92 which provides fluid communication between the inlet 28 of the resin tank 22 and a port 94 formed in the valve housing 72 and cage 73 as shown in FIGS. 9 and 11. The housing 42 also includes a conduit member 96 which forms a fluid passage between the outlet member 30 of the resin tank 22 and a port 98 formed in the valve housing 72 and cage 73 as best shown in FIGS. 10 and 12. The housing 42 also includes a conduit member 100 which provides fluid communication between the inlet 34 of the resin tank 24 and a port 102 formed in the valve housing 72 and cage 73 as best shown in FIGS. 9 and 11. A conduit member 104 forms a fluid passage between the outlet 36 of the resin tank 24 and a port 106 formed in the valve housing 72 and cage 73 as best shown in FIGS. 10 and 12.

As best shown in FIG. 9, when the rotor 74 is located in the first position, the outlet port 88 provides fluid communication between the upper chamber 80 of the rotor 74 and the port 94 of the conduit member 92 and therethrough with the inlet 28 of the resin tank 22. As best shown in FIG. 11, when the rotor 74 is rotated to the second position, the outlet port 88 provides fluid communication between the upper chamber 80 and the port 102 of the conduit member 100 and therethrough with the inlet 34 of the resin tank 24. When the rotor 74 is located in the first position, the upper chamber 80 is sealed from the port 102 and the inlet 34 of the tank 24. When the rotor 74 is located in the second position, the upper chamber 80 is sealed from the port 94 and the inlet 28 of the tank 22.

As best shown in FIGS. 13 and 14, the lower chamber 82 of the rotor 74 includes an inlet port 110. As best shown in FIG. 10, when the rotor 74 is located in the first position, the inlet port 110 provides fluid communication between the lower chamber 82 and the port 98 of the conduit member 96 and therethrough with the outlet 30 of the resin tank 22. As best shown in FIG. 12, when the rotor 74 is rotated to the second position, the inlet port 110 provides fluid communication between the lower chamber of 82 and the port 106 of the conduit member 104 and therethrough with the outlet 36 of the resin tank 24. The lower chamber 82 also includes an outlet port 112 as best shown in FIG. 14 located at the bottom end 76 of the rotor 74. The outlet port 112 provides fluid communication between the lower chamber 82 and the inlet port 56 of the outlet passage 54 to provide fluid communication between the lower chamber 82 and the outlet port 58 when the rotor 74 is in the first position and also when the rotor 74 is in the second position. The lower chamber 82 also includes a plurality of outlet ports 114 formed at the upper end of the lower chamber 82 just below the wall 84.

As shown in FIGS. 13 and 14 the tank selector valve 70 includes a gasket 116 located circumferentially around the rotor 74 below the inlet ports 86, a gasket 118 which extends circumferentially around the rotor 74 which is located between the outlet port 88 and the outer ports 114, a gasket 120 which extends circumferentially around the rotor 74 between the outlet ports 114 and the inlet port 110, and a gasket 122 which extends circumferentially around the rotor 74 at the bottom end 76 below the inlet port 110. The gaskets 116, 118, 120 and 122 prevent fluid communication between the inlet ports 86, outer port 88, outlet ports 114, inlet port 110 and outlet port 112 externally of the rotor 74 between the rotor 74 and cage 73 or valve housing 72. The upper end 78 of the rotor 74 includes a plurality of spaced apart notches 124.

Figure 4:
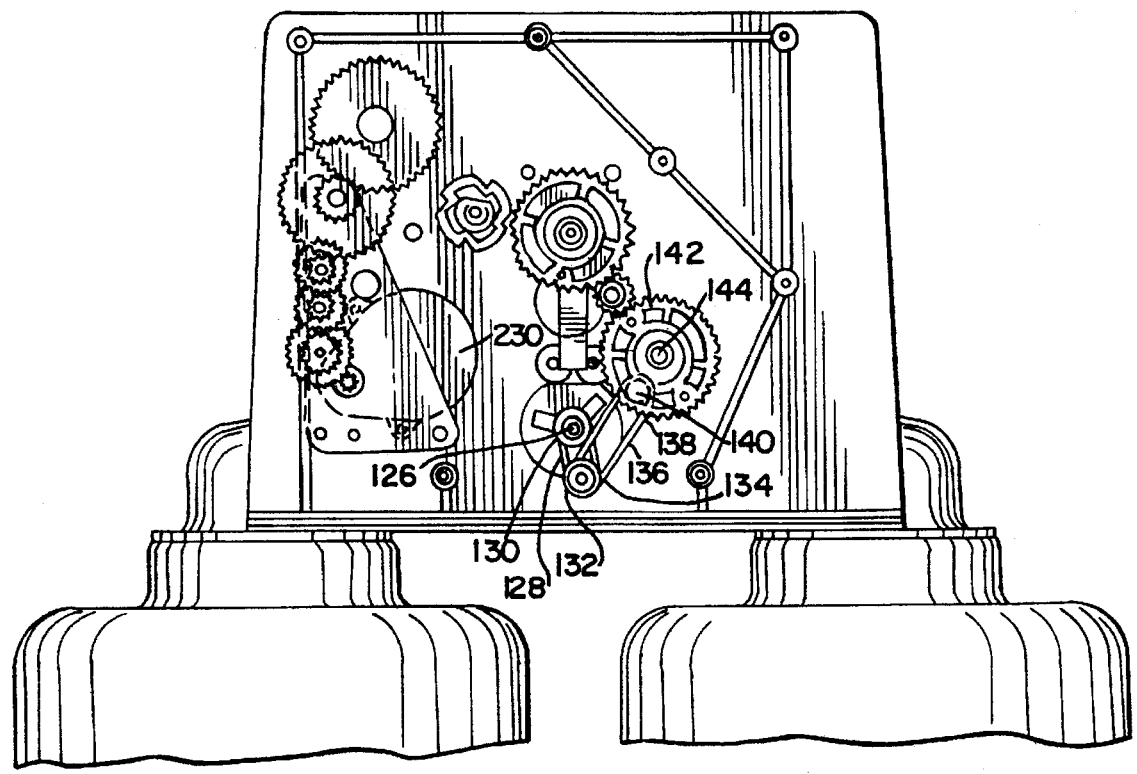
FIG. 4 is a cross-sectional view of the control mechanism taken along lines 4—4 of FIG. 2.

As best shown in FIGS. 4 and 5, a stem 126 is attached to the upper end 78 of the rotor 74 by inter-engagement with the notches 124. As best shown in FIG. 4, an arm 128 is attached at a first end 130 to the stem 126. A second end 132 of the arm 128 is pivotally attached to a first end 134 of an arm 136. A second end 138 of the arm 136 is pivotally attached to a pin 140 of a cam member 142. The cam member 142 selectively rotates about an axis 144 which is offset from the pin 140 and from the axis about which the second end 138 of the arm 136 pivots with respect to the pin 140. Selective rotation of the cam member 142 thereby selectively rotates the stem 126 and the rotor 74 about the axis 75 between the first position and the second position as desired.

The control mechanism 20 also includes a regeneration valve 150 as best shown in FIGS. 5–7. The regeneration valve 150 includes a valve housing 152 which is integrally formed with the housing 42. The regeneration valve 150 includes a plurality of annular spool members 154A–D stacked one on top of the other with a generally annular gasket 156A–D respectively located between each spool 154A–D and on top of the spool 154A. Each spool 154A–D includes a pair of spaced apart and generally parallel planar plates 158, each having a generally circular outer rim 160 and a concentrically located generally circular inner rim 162. A plurality of vanes 164 extend vertically between the plates 158. The vanes 164 permit fluid communication between the outer rim 160 and the inner rim 162 of each spool 154A–D between the plates 158. Each of the gaskets 156A–D includes a generally circular inner rim 166. A generally cylindrical bore 168 extends through the inner rims 162 and 166 of the spools 154A–D and gaskets 156A–D. A generally cylindrical piston 170 is slidably disposed within the bore 168. The piston 170 includes a generally cylindrical outer surface 172 having a first inwardly extending groove 174 which extends circularly about the piston 170 and a longitudinally spaced apart second groove 176 which extends inwardly and circularly around the piston 170. The piston 170 includes a bore 177 extending longitudinally therethrough. The inner rims 166 of the gaskets 156A–D are sized to engage the outer surface 172 of the piston 170 except that a passage is formed between the gaskets 156A–D and the piston 170 when a gasket 156A–D is located across from a groove 174 or 176.

The piston 170 is slidable longitudinally within the bore 168 to selectively open and close fluid passages between the spools 154A–D. The piston 170 is selectively moved longitudinally within the bore 168 by the action of a rotary cam member 178. The rotary cam member 178 is generally cylindrical and includes a circumferential groove or track 180 which receives and retains a cam follower member 182 which is attached to the piston 170. The track 180 extends around the cam member 178 upwardly from a low point 184 to a high point 186 located diametrically across from the low point 184 and then returns downwardly to the low point 184. The various location of the cam follower member 182 and piston 170 relative to the track 180 are illustrated in FIG. 8. As the cam member 178 rotates, the cam follower member 182 moves along the track 180 from the high point 186 towards the low point 184 and the piston 170 correspondingly slides longitudinally along the axis 188 downwardly from the fully raised position shown in FIG. 6 until the cam follower member 182 reaches the low point 184 wherein the piston 170 is located in the lowest position. Thereafter, as the rotary cam member 178 continues to rotate, the cam follower member 182 will follow the track 180 upwardly from the low point 184 towards the high point 186 while correspondingly sliding the piston 170 upwardly along the longitudinal axis 188 until the cam follower member 182 reaches the high point 186. The rotary cam member 178 is attached to a gear 190 which is selectively driven by an electric motor 192.

As best shown in FIGS. 9 and 11, the tank selector valve 70 also includes an upper regeneration inlet chamber 200, and as best shown in FIGS. 10 and 12, a lower regeneration outlet chamber 202. The upper regeneration chamber 200 is formed between a wall portion 204 of the rotor 74 and the cage 73 and extends between spaced apart ribs 206 and 208 formed on the rotor 74. The lower regeneration chamber 202 is located between a wall portion 210 of the rotor 74 and the cage 73 and extends between spaced apart ribs 212 and 214 formed on the rotor 74. When the rotor 74 is located in either the first position or the second position, the outlet ports 114 of the lower chamber 82 of the selector valve 70 provide fluid communication between the lower chamber 82 and the spool 154C through a port 215 extending through the cage 73, valve housing 72 and valve housing 152, and the port 106 of the conduit member 104 and therethrough with the outlet 30 of the resin tank 24. When the rotor 74 is located in the first position as shown in FIGS. 9 and 10, the upper regeneration chamber 200 provides fluid communication between the spool 154B of the regeneration valve 150 through a port 216, which extends through the valve housing 72, valve housing 152 and cage 73, and the port 102 of the conduit member 100 and therethrough with the inlet 28 of the resin tank 24. When the rotor 74 is located in the first position, the lower regeneration chamber 202 provides fluid communication between the spool 154D of the regeneration valve 150 through a port 218, which extends through the valve housing 72, cage 73 and valve housing 152, and the port 106 of the conduit member 104 and therethrough with the outlet 30 of the resin tank 24. When the rotor 74 is located in the second position as shown in FIGS. 11 and 12, the upper regeneration chamber 200 provides fluid communication between the spool member 154B through the port 216 and the inlet 28 of the resin tank 22 through the port 94 of the conduit member 92. When the rotor 74 is located in the second position, the lower regeneration chamber 202 provides fluid communication between the spool 154D of the regeneration valve 150 through the port 218 and the outlet 30 of the resin tank 22 through the port 98 of the conduit member 96. An eductor valve 232 provides selective fluid communication between the brine tank (not shown) through the brine port 64 and the spool 154B through a fluid passage 220 and the spool 154D through a fluid passage 221, as best shown in FIG. 5, as desired to provide a flow of brine solution to the tanks 22 and 24.

Figure 3:
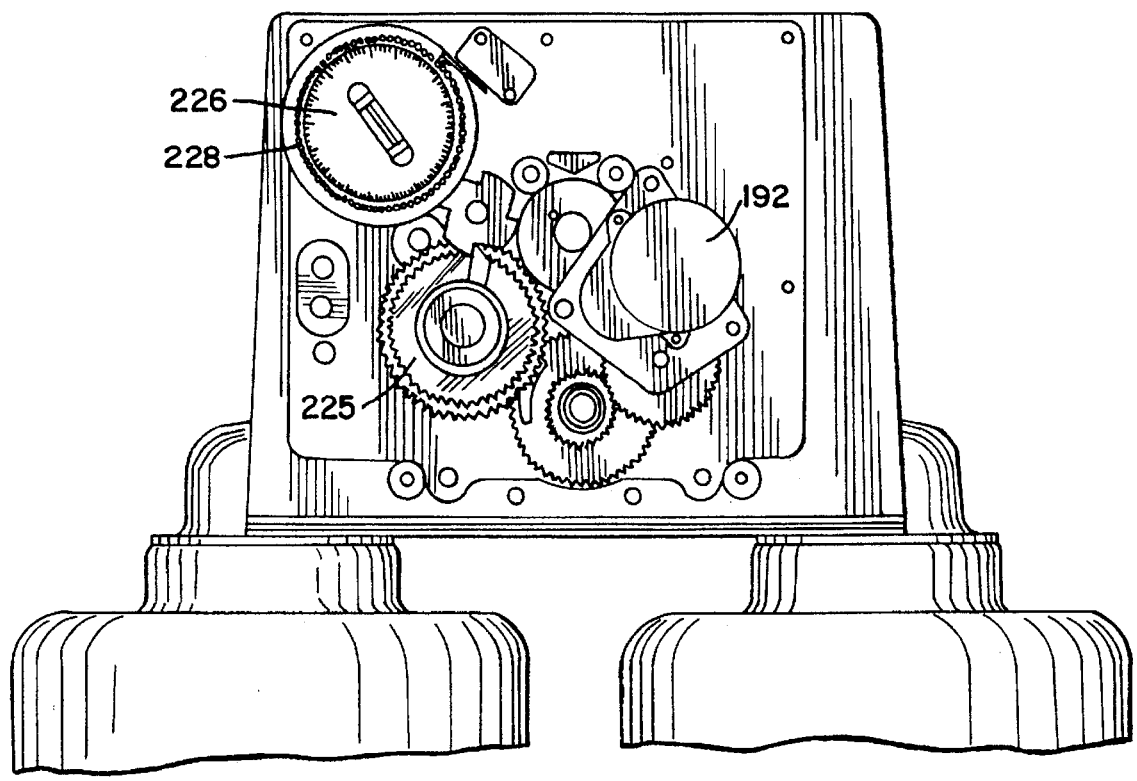
FIG. 3 is a side elevational view of the control mechanism taken along lines 3—3 of FIG. 2.

The control mechanism 20 includes an eleectromechanical control mechanism 222 as best shown in FIGS. 2–4. The controls 222 are typical controls as provided for use with water softener systems and operate in a conventional manner. The controls 222 include a total flow volume wheel 225 which is driven by a cable 224 connected to the flow meter 60. The control 222 also include a regeneration wheel 226 having a plurality of pins 228 which may be inserted or removed from the regeneration wheel 226 to determine the time duration of the various regeneration cycles. An electric motor 230 drives the regeneration wheel 226 and the rotor 74.

In operation, when the rotor 74 of the tank selector valve 70 is rotated to the first position as shown in FIGS. 9 and 10, untreated water flows into the inlet passage 46 through the port 48 and into the upper chamber 80 of the rotor 74 through the outlet port 50. The untreated water in the upper chamber 80 then flows through the outlet port 88 and port 94 into the conduit member 92. The untreated water in the conduit member 92 flows through the inlet 28 of the resin tank 22 and flows downwardly through the resin bed 26 therein for treatment. Treated water at the bottom of the resin tank 22 flows upwardly through the riser pipe 32 and out the outlet 30 of the resin lank 22 into the conduit member 96. The treated water in the conduit member 96 flows through the port 98 and the inlet port 110 of the rotor 74 into the lower chamber 82. The treated water within the lower chamber 82 flows through the outlet port 112 at the bottom of the rotor 74 and through the inlet port 56 into the outlet passage 54. The treated water in the outlet passage 54 exits through the port 58 for use throughout the system.

When the rotor 74 is located in the first position and the resin tank 22 is on-line providing treated water for use, the resin tank 24 is off-line and may be regenerated. The motor 192 rotates the rotary cam member 178 to a selected position wherein the cam follower member 182 is located in the track 180 at the backwash position as shown in FIG. 8 and the piston 170 is thereby selectively positioned within the bore 168 as shown in FIG. 7. Treated water from the lower chamber 82 flows through the outlet port 114 to the spool 154C of the regeneration valve 150. The treated water flows out of the spool 154C and through the groove 176 and the subjacent spool 154D to the lower regeneration chamber 202 of the tank selector valve 70. The treated water in the lower regeneration chamber 202 then flows through the port 106 to the conduit member 104 and through the outlet 36 and riser pipe 38 to the bottom of the resin tank 24. The treated water flows upwardly through the resin bed 26 and out the inlet 34 of the resin tank 24 and flows through the conduit member 100 and port 102 into the upper regeneration chamber 200 of the tank selector valve 70. The treated water in the upper regeneration chamber 200 then flows from the chamber 200 through the port 216 to the spool 154B and through the groove 174 and the spool 154A to the drain port 62 for disposal.

When the backwash cycle is completed, the rotary cam member 178 rotates to the brine position which locates the cam follower member 182 and piston 170 as shown in FIG. 8. The eductor valve 232 then draws brine solution from a brine tank (not shown) through the brine port 64. The brine flows from the eductor valve 232 to the spool 154B and upper regeneration chamber 200 and therethrough to the conduit member 100 and the inlet 34 of the resin tank 24. The brine is withdrawn through the outlet 36 of the resin tank 24, through the conduit member 104, through the lower regeneration chamber 202 of the tank selector valve 70 to the spool 154D, through the bore 177 of the piston 170 and the spool 154A to the drain port 62. The brine regenerates the ion exchange resin bed 26.

The rotary cam member 178 is then rotated further to a rinse position which locates the piston 170 and cam follower member 182 as shown in FIGS. 6 and 8. Treated water from the lower chamber 82 of the rotor 74 flows through the ports 114 and through the spool 154C and then through the groove 174 and spool 154B to the upper regeneration chamber 200 of the tank selector valve 70. The treated water then flows through the port 102 and through the conduit member 100 to the inlet 34 of the resin tank 24. The treated water then rinses any excess salt from the resin bed 26 and prepares the resin bed for use. The rinse water flows through the riser pipe 38 and through the outlet 36 to the conduit member 104 and flows through the port 106 into the lower regeneration chamber 202 of the tank selector valve 70, through the port 218 to the spool 154D, through the bore 177 in the piston 170 and out the spool 154A to the drain port 62.

The rotary cam member 178 is then rotated to position the cam follower member 182 and the piston 170 to the fill position as illustrated in FIG. 8. Treated water flows from the regeneration valve 150 through the eductor valve 232 and brine port 64 to the brine tank (not shown) to refill the brine tank. The rotary cam member 178 is then further rotated to position the cam follower member 182 and piston 170 in the stand-by position as shown in FIG. 8.

Once the resin tank 22 has provided a predetermined volume of treated water as measured by the flow meter 60, the rotary cam member 178 is rotated to position the cam follower member 182 and piston 170 in the rinse position as shown in FIGS. 6 and 8 to rinse the stale water that was standing in the off-line resin tank 24 therefrom. The motor 192 then rotates the cam member 142 and thereby the shaft of the rotor 74 to selectively rotate the rotor 74 from the first position to the second position. Untreated water in the inlet passage 46 now flows into the upper chamber 80 of the rotor 74 and is directed through the outlet port 88 and port 102 to the conduit member 100 and to the inlet 34 of the resin tank 24. Treated water from the bottom of the resin bed 26 of the resin tank 24 flows through the riser pipe 38 and outlet 36 of the resin tank 24 through the conduit member 104 and port 106, and through the inlet port 110 into the lower chamber 82 of the rotor 74. The treated water flows through the outlet port 112 in the bottom of the rotor 74, through the inlet port 56 into the outlet passage 54 and out the port 58 for use. While the resin tank 24 is on-line providing treated water for use, the resin tank 22 is off-line and may be regenerated in substantially the same manner as described above in regard to the resin tank 24 except that the upper regeneration chamber 200 is now in fluid communication with the port 94 and the lower regeneration chamber 202 is now in fluid communication with the port 98.

In addition to being rotatable between the first position and the second position, the rotor 74 may also be rotated to a third position wherein the outlet port 88 of the upper chamber 80 provides untreated water simultaneously to both resin tanks 22 and 24 for treatment and the lower chamber 82 simultaneously receives treated water from both resin tanks 22 and 24 through the inlet port 110. In addition, the rotor 74 may be rotated to a fourth position wherein the upper chamber 80 is sealed from both the resin tanks 22 and 24 to prevent any fluid flow therethrough such as when a user may be on vacation.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A control mechanism for a liquid treatment system which has a first tank with an inlet and an outlet and a second tank with an inlet and an outlet, said control mechanism including:

a housing defining an inlet passage for receiving liquid to be treated and an outlet passage for dispensing treated liquid;

a tank selector valve including a rotor, said rotor having a first chamber in fluid communication with said inlet passage and a second chamber in fluid communication with said outlet passage;

a first fluid path adapted to provide selective fluid communication between said first chamber and the inlet of the first tank;

a second fluid path adapted to provide selective fluid communication between said first chamber and the inlet of the second tank;

a third fluid path adapted to provide selective fluid communication between said second chamber and the outlet of the first tank;

a fourth fluid path adapted to provide selective fluid communication between said second chamber and the outlet of the second tank, said rotor being rotatable between a first position wherein said rotor provides fluid communication between said first chamber and said first fluid path and fluid communication between said second chamber and said third fluid path, and a second position wherein said rotor provides fluid communication between said first chamber and said second fluid path and fluid communication between said second chamber and said fourth fluid path;

means for selectively moving said rotor between said first position and said second position;

a regeneration valve in fluid communication with said second chamber of said rotor, a fifth fluid path adapted to provide selective fluid communication between said second chamber of said rotor and the first tank and a sixth fluid path adapted to provide selective fluid communication between said second chamber of said rotor and the second tank, said regeneration valve adapted to selectively open and close said fifth and sixth fluid paths; and means for selectively moving said regeneration valve to selectively open and close said fifth and sixth fluid paths.

2. The control mechanism of claim 1 wherein said tank selector valve includes an inlet chamber, said inlet chamber adapted to be placed in fluid communication with the inlet of the second tank when said rotor is in said first position, said inlet chamber adapted to be placed in fluid communication with the inlet of the first tank when said rotor is in said second position.

3. The control mechanism of claim 2 wherein said regeneration valve provides selective fluid communication between said second chamber and said inlet chamber of said tank selector valve.

4. The control mechanism of claim 3 wherein said tank selector valve includes an outlet chamber, said outlet chamber adapted to be placed in fluid communication with the outlet of the second tank when said rotor is in said first position, said fourth chamber adapted to be placed in fluid communication with the outlet of the first tank when said rotor is in said second position.

5. The control mechanism of claim 4 wherein said regeneration valve provides selective fluid communication between said second chamber and said outlet chamber of said tank selector valve.

6. The control mechanism of claim 1 wherein said means for selectively moving said rotor includes a first arm having a first end and a second end, said first end of said first arm being attached to said rotor, a second arm having a first end and a second end, said first end of said second arm being pivotally attached to said second end of said first arm, and a rotor camming member moveable between a first position and a second position, said second end of said second and being attached to said rotor camming member, wherein when said rotor camming member moves to said first position, said rotor camming member rotates said rotor to said first position and when said rotor camming member moves to said second position, said rotor camming member rotates said rotor to said second position.

7. The control mechanism of claim 1 wherein said first chamber of said tank selector valve includes an inlet port and an outlet port.

8. The control mechanism of claim 7 wherein said second chamber of said tank selector valve includes an inlet port, a first outlet port in fluid communication with said outlet passage and a second outlet port in fluid communication with said regeneration valve.

9. The control mechanism of claim 8 wherein said tank selector valve includes an inlet chamber and an outlet chamber and said regeneration valve includes a first member in fluid communication with said second outlet port of said second chamber of said tank selector valve, a second member in fluid communication with said inlet chamber of said tank selector valve, and a third member in fluid communication with said outlet chamber of said tank selector valve, said regeneration valve providing selective fluid communication between said first member and said second member and providing selective fluid communication between said first member and said third member.

10. The control mechanism of claim 9 wherein said regeneration valve includes a piston, said piston being longitudinally moveable to any of a plurality of positions to provide said selective fluid communication between said first, second and third members.

11. The control mechanism of claim 10 wherein said means for selectively moving said regeneration valve includes a piston camming member, said piston camming member being selectively rotatable to any of a plurality of positions, rotation of said piston camming member to a desired position being operative to correspondingly move said piston to a desired location.

12. The control mechanism of claim 11 wherein said piston camming member includes a track and said piston includes a cam following member engaging said track.

13. The control mechanism of claim 1 wherein said first chamber and said second chamber are located within said rotor.

14. The control mechanism of claim 13 wherein said tank selector valve includes an inlet chamber and outlet chamber, said inlet and outlet chambers being in selective fluid communication with said regeneration valve.

15. The control mechanism of claim 14 wherein said inlet and outlet chambers are located externally of said rotor.

16. A control mechanism for a liquid treatment system having a first tank with an inlet and an outlet and a second tank with an inlet and an outlet, said control mechanism including: an inlet passage for receiving liquid to be treated and an outlet passage for dispensing treated liquid, a tank selector valve including a valve housing, a first fluid path port adapted to provide fluid communication with the inlet of the first tank, a second fluid path port adapted to provide fluid communication with the inlet of the second tank, a third fluid path port adapted to provide fluid communication with the outlet of the first tank, a fourth fluid path port adapted to provide fluid communication with the outlet of the second tank, and a rotor rotatably located within said housing, said rotor being selectively rotatable between a first position and a second position, said rotor including a first chamber having a first port adapted to provide fluid communication between the inlet passage and said first chamber and a second port, said second part of said first chamber adapted to provide fluid communication between said first chamber and said first fluid path port when said rotor is located in said first position and to provide fluid communication between said first chamber and said second fluid path port when said rotor is rotated to said second position, and a second chamber having a first port in fluid communication with the outlet passage and a second port, said second port of said second chamber adapted to provide fluid communication between said second chamber and said third fluid path port when said rotor is located in said first position and to provide fluid communication between said second chamber and said fourth fluid path port when said rotor is rotated to said second position.

17. The control mechanism of claim 16 wherein said tank selector valve includes a fifth fluid path port adapted to provide fluid communication with a regeneration valve and said rotor includes an inlet chamber, said inlet chamber adapted to provide fluid communication between said fifth fluid path port and said second fluid path port when said rotor is located in said first position and to provide fluid communication between said fifth fluid path port and said first fluid path port when said rotor is located in said second position.

18. The control mechanism of claim 17 wherein said tank selector valve includes a sixth fluid path port adapted to provide fluid communication with the regeneration valve and said rotor includes an outlet chamber, said outlet chamber adapted to provide fluid communication between said sixth fluid path port and said fourth fluid path port when said rotor is located in said first position and to provide fluid communication between said sixth fluid path port and said third fluid path port of said housing when said rotor is located in said second position.

19. The control mechanism of claim 17 wherein said second chamber of said rotor includes a third port adapted to provide fluid communication with the regeneration valve when said rotor is located in said first and second positions.

* * * * *